Oct. 30, 1956  N. R. ANDERSON  2,768,611
CUSHIONED POWER CYLINDER
Filed March 15, 1954
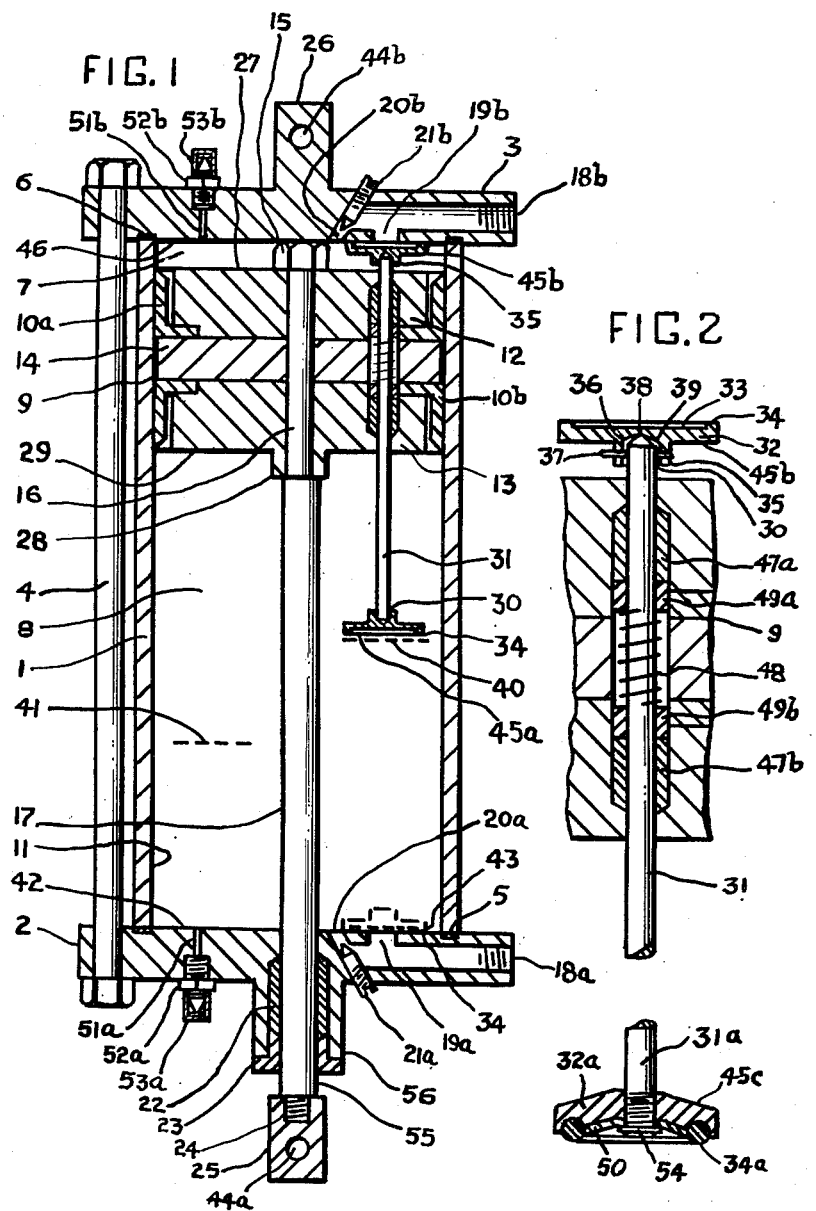
INVENTOR,
Neville Rupert Anderson,
by [signature]
HIS ATTORNEY.

United States Patent Office 2,768,611
Patented Oct. 30, 1956

2,768,611

CUSHIONED POWER CYLINDER

Neville Rupert Anderson, Edgecliff, New South Wales, Australia

Application March 15, 1954, Serial No. 416,257

Claims priority, application Australia April 2, 1953

11 Claims. (Cl. 121—38)

The present invention has reference to improvements in or relating to fluid operated power cylinders of the cushioned type. It provides a cushioned power cylinder having a piston operable in a chamber provided with a cushioning valve port at each end having a removable cushioning valve disc, said discs being attached to one another by a rod, a substantial length of said rod being slidable through said piston longitudinally, said piston having a detent in frictional contact with said rod, and said detent being loaded to deter slipping of said rod relatively to said piston due to weight and inertia of said rod.

The detent preferably consists of a flexible packing surrounding the rod in a fluid-tight manner and urged to contract, by for example a spring, and thus firmly grasp the rod so that an appreciable thrust has to be applied to an end of the rod before said rod will slide relatively to said piston.

Another purpose is to provide in a cushioned pneumatic power cylinder a semi-solid or plastic filling, such as for instance grease, for the dead space between the adjacent cylinder head and the piston at the end of a stroke, and thus produce a high compression ratio for cushioning without requiring fine clearances between said head and said piston.

Other objects and improvements will appear from the following description, taken in connection with the drawing, which illustrates the invention by way of example and in which:

Figure 1 is a longitudinal cross section through one form of this invention as applied to a double acting pneumatic power cylinder. In plan the unit is circular and need not be illustrated for the purpose of explaining the present invention.

Figure 2 is an enlarged view of part of Figure 1.

Figure 3 is a longitudinal cross section through portion of one form of plunger.

In Figure 1 a cylindrical chamber 1 has end enclosing means consisting of a gland cylinder head 2 and a blind cylinder head 3 held together by a plurality of tie rods similar to tie rod 4, a fluid-tight joint being formed at the heads 2 and 3 by gaskets 5 and 6.

The chamber 1 is divided into an upper compartment 7 and a lower compartment 8 by a piston 9 having piston cups 10a and 10b which maintain substantially fluid-tight contact with the inside wall 11 of the chamber 1 while the piston 9 travels between the heads 2 and 3 in an axial or longitudinal direction.

The piston cups 10a and 10b are clamped by an upper piston disc 12 and a lower piston disc 13 to a piston centre piece 14 in a fluid-tight manner by a piston rod nut 15 located on a reduced end 16 of a piston rod 17.

The gland cylinder head 2 contains a threaded inlet port 18a communicating with a cushioning valve port 19a and a bye-pass port 20a, both of these latter ports 19a and 20a communicating with the lower compartment 8, the bye-pass port 20a being provided with a bye-pass valve 21a consisting of an adjustable screw.

The blind cylinder head 3 contains a threaded inlet port 18b communicating with a cushioning valve port 19b and a bye-pass port 20b, both these latter ports 19b and 20b communicating with the upper compartment 7, the bye-pass port 20b being provided with a bye-pass valve 21b consisting of an adjustable screw.

The piston rod 17 passes in a substantially fluid-tight manner through a packing 22 and a gland nut 23 in the gland cylinder head 2, the external end of the piston rod 17 being provided with a thread 24 to take a clevis 25 for attaching to the load by means of a clevis pin passing through a clevis pin hole 44a.

The blind cylinder head 3 has a clevis 26 for attaching to any suitable support by means of a clevis pin passing through a clevis pin hole 44b.

In Figure 1 the piston 9 is shown at the top of its stroke or travel and in this position it will be noted that the piston rod nut 15 acts as a spacer by projecting appreciably beyond the top disc face 27, and it will be similarly understood that a boss 28 acts as a spacer by projecting appreciably beyond the bottom disc face 29.

The piston 9 is provided with a cushioning valve plunger 30 comprising a plunger rod 31 passing through the piston 9 in an axial or longitudinal direction, the plunger rod 31 having a top valve disc 45b and a bottom valve disc 45a.

Referring to Figure 2, the top valve disc 45b consists of a circular flange 32 having a recessed centre 33 surrounded by a lip 34, the flange 32 having a boss 35 with a hole 36 to take the plunger rod 31 as a loose fit; a split pin 37 which passes through the boss 35 and the plunger rod 31 is also a loose fit; the end of the plunger rod 31 has a point 38 so as to centre in a corresponding hollow 39 at the end of the hole 36; as a result of this construction, the valve disc 45b, although secured to the plunger rod 31 by a split pin 37, is self-aligning, that is to say, the valve disc 45b is capable of wobbling or tilting in relationship to the plunger rod 31 and this permits the lip 34 to lie flat against the inner surface 46 of the blind cylinder head 3, as shown in Figure 1, and thus obstruct the flow of air from the upper compartment 7 out through the cushioning valve port 19b.

Referring to Figure 1, when compressed air is supplied to the inlet port 18b the pressure blows the valve disc 45b down a short distance till the boss 35 makes contact with the top disc face 27, thus permitting air to flow freely into the upper compartment 7 through the cushioning valve port 19b; when the top valve disc 45b is blown down as just described this forces the plunger rod 31 and the bottom valve disc 45a down a corresponding distance so that the lip 34 of the bottom valve disc 45a takes up a position indicated by the dotted line 40.

When the air pressure in the upper compartment 7 forces the piston 9 to move downwards, the piston 9 and the plunger 30 travel downwards together, that is to say, while the bottom disc face 29 travels down to the dotted line 41, the bottom valve disc 45a travels an equivalent distance, namely, from the dotted line 40 to the inner face 42 of the gland cylinder head 2.

Until just before the bottom valve disc 45a contacts the inner face 42, air from the lower compartment 8 can flow freely through the cushioning valve port 19a, thus permitting the piston 9 to travel down to the dotted line 41 freely, namely, without being retarded by any appreciable building up of back pressure in the lower compartment 8.

When, however, the bottom disc face 29 of the piston 9 reaches the dotted line 41, the flow of air from the lower compartment 8 through the cushioning valve port 19a is obstructed by the lip 34 contacting the inner face 42, as indicated by the dotted line 43.

Further downward travel of the piston 9 hence compresses the air trapped in this way in the lower compartment 8, thus building up a back pressure, or cushion of air, which creates a retarding force of increasing magnitude as the piston 9 continues to approach the gland cylinder head 2.

To avoid the said retarding force, or cushion, from building up sufficiently to prevent the boss 28 of the piston 9 from completing its downward stroke, the bye-pass valve 21a is adjusted so as to provide an escape through the bye-pass port 20a at any desired rate of the air trapped in the lower compartment 8.

Referring to the Figure 2, the plunger rod 31 is in frictional contact with a detent or radially acting clamp comprising flexible packings 47a and 47b which surround said rod 31 in a fluid-tight manner in the piston 9, said packings 47a and 47b being continually urged to contract by a compression spring 48 pressing on rings 49a and 49b, and thus deter slipping of said rod 31 relatively to said piston 9 due to weight and inertia of said rod.

The grip exerted by the packings 47a and 47b on the plunger rod 31 is made sufficient by means of the spring 48 to prevent movement of the cushioning valve plunger 30 relatively to the piston 9, except when an appreciable force is applied to an end of the said plunger 30. Hence, the cushioned power cylinder the subject of this invention is operable in a vertical as well as any other position, and in the presence of many shock loads which, because of inertia of the plunger, could not otherwise be handled by this method of cushioning.

Another form of valve disc 45c is shown in Figure 3 in which the flange 32a is screwed onto the plunger rod 31a and locked thereon by a circular clip 54, said clip securing a washer 50 which clamps a lip 34a of flexible material, as for instance synthetic rubber, to the flange 32a, the flexibility of the said lip 34a making the cap 45c self-aligning.

Referring to Figure 1, the cylinder heads 2 and 3 are provided with a filler, such as for instance, grease gun nipples 52a and 52b screwed into passages 51a and 51b by means of which a semi-solid or plastic filling, such as light grease, may be injected into the compartments 7 and 8, said nipples 52a and 52b having screwed on covers 53a and 53b. In this way the dead space between the piston 9 at the end of a stroke and the adjacent cylinder head may be kept charged with a semi-solid filling, resulting in a high compression ratio and hence powerful cushioning; the said filling is to an extent blown about in the chamber by the compressed air and hence may act as a lubricant and means of promoting fluid-tightness.

To provide a readily visible indication that the plunger 30 is substantially in longitudinal alignment with the fluid handling ports 19a and 19b, a line is drawn from the outside face 56 of the gland cylinder head 2, onto the external portion 55 of the piston rod 17.

I claim:

1. In a cushioned power cylinder providing a chamber, a piston operable in said chamber, said chamber having a cushioning valve port at each end, a removable cushioning valve disc for each of said ports, a rod attaching said discs to one another, a substantial length of said rod being slidable through said piston longitudinally, said piston having a detent and means coacting with and urging said detent into frictional contact with said rod, whereby slipping of said rod relatively to said piston due to weight and inertia of said rod is deterred.

2. A cushioned power cylinder according to claim 1 wherein said detent comprises packing carried by said piston.

3. A cushioned power cylinder according to claim 1 wherein said means comprises a spring carried by said piston.

4. A cushioned power cylinder according to claim 1 wherein said detent comprises a plurality of packings carried by said piston and said means is a spring separating the packings.

5. In a cushioned power cylinder providing a chamber, a piston operable in said chamber, said chamber having a cushioning valve port at each end, a removable cushioning valve disc for each of said ports, a rod attaching said discs to one another, said piston having a radially acting clamp, means urging said clamp to grip said rod, a substantial length of said rod being slidable through said piston longitudinally in a fluid-tight manner only when said rod is pushed backwards and forwards relatively to said piston by an appreciable thrust applied to the ends of said rod.

6. In a cushioned power cylinder, a piston therein having a piston rod, a cushioning valve plunger passing through said piston longitudinally at one side of said piston rod, packing carried by the piston surrounding said plunger, and resilient means continually urging contraction of said packing around said plunger to normally hold said plunger against movement relatively to said piston and to permit movement when an appreciable force is applied to an end of said plunger.

7. In a cushioned power cylinder, a piston therein, a cushioning valve plunger carried by said piston, a substantial length of said plunger being slidable through said piston in a fluid-tight manner, said piston having a clamp, and means urging said clamp against said plunger.

8. A cushioned power cylinder according to claim 6 having a filler means in the end of the cylinder for charging the dead space between the adjacent cylinder head and the piston with a semi-solid filling.

9. A cushioned power cylinder according to claim 6 having a grease nipple provided in the end of the cylinder for charging the dead space between the adjacent cylinder head and the piston with grease.

10. A cushioned power cylinder according to claim 1 having a filler means provided in each chamber for charging dead space in said chambers with a semi-solid filling.

11. A cushioned power cylinder according to claim 1 having a grease nipple provided in each chamber for charging dead space in said chambers with grease.

References Cited in the file of this patent

UNITED STATES PATENTS

| | | |
|---|---|---|
| 561,747 | Worthington | June 9, 1896 |
| 1,604,548 | Dapron | Oct. 26, 1926 |
| 1,744,069 | Dapron | Jan. 21, 1930 |
| 1,833,216 | Hanna | Nov. 24, 1931 |
| 2,406,173 | Stephens | Aug. 20, 1946 |
| 2,556,698 | Loewe | June 12, 1951 |

FOREIGN PATENTS

| | | |
|---|---|---|
| 420,843 | Great Britain | Dec. 10, 1934 |